(12) United States Patent
Orr et al.

(10) Patent No.: US 9,804,883 B2
(45) Date of Patent: Oct. 31, 2017

(54) REMOTE SCOPED SYNCHRONIZATION FOR WORK STEALING AND SHARING

(71) Applicant: Advanced Micro Devices, Inc., Sunnyvale, CA (US)

(72) Inventors: Marc S. Orr, Newcastle, WA (US); Bradford M. Beckmann, Redmond, WA (US); Ayse Yilmazer, Bellevue, WA (US); Shuai Che, Bellevue, WA (US); David A. Wood, Madison, WI (US); Mark D. Hill, Madison, WI (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 365 days.

(21) Appl. No.: 14/542,042

(22) Filed: Nov. 14, 2014

(65) Prior Publication Data

US 2016/0139624 A1     May 19, 2016

(51) Int. Cl.
*G06F 9/46*     (2006.01)
*G06F 12/0806*     (2016.01)
(Continued)

(52) U.S. Cl.
CPC .................. *G06F 9/46* (2013.01); *G06F 3/06* (2013.01); *G06F 12/0806* (2013.01);
(Continued)

(58) Field of Classification Search
CPC .......... G06F 9/46; G06F 3/06; G06F 12/0871; G06F 12/0806; G06F 2212/401; G06F 2212/222; G06F 2212/313
See application file for complete search history.

(56) References Cited

U.S. PATENT DOCUMENTS

| 6,516,372 B1* | 2/2003 | Anderson | G06F 12/0888 |
| | | | 710/300 |
| 6,904,597 B2* | 6/2005 | Jin | G06F 9/544 |
| | | | 719/312 |

(Continued)

OTHER PUBLICATIONS

Orr et al., "Synchronization using remote-scope promotion" ASPLOS, 2015, Mar. 14-18, 2015.*

(Continued)

*Primary Examiner* — Benjamin Wu
(74) *Attorney, Agent, or Firm* — Volpe and Koenig, P.C.

(57) ABSTRACT

Described herein is an apparatus and method for remote scoped synchronization, which is a new semantic that allows a work-item to order memory accesses with a scope instance outside of its scope hierarchy. More precisely, remote synchronization expands visibility at a particular scope to all scope-instances encompassed by that scope. Remote scoped synchronization operation allows smaller scopes to be used more frequently and defers added cost to only when larger scoped synchronization is required. This enables programmers to optimize the scope that memory operations are performed at for important communication patterns like work stealing. Executing memory operations at the optimum scope reduces both execution time and energy. In particular, remote synchronization allows a work-item to communicate with a scope that it otherwise would not be able to access. Specifically, work-items can pull valid data from and push updates to scopes that do not (hierarchically) contain them.

19 Claims, 17 Drawing Sheets

(51) Int. Cl.
*G06F 3/06* (2006.01)
*G06F 12/0871* (2016.01)

(52) U.S. Cl.
CPC .... *G06F 12/0871* (2013.01); *G06F 2212/222* (2013.01); *G06F 2212/313* (2013.01); *G06F 2212/401* (2013.01)

(56) References Cited

U.S. PATENT DOCUMENTS

| | | | | |
|---|---|---|---|---|
| 7,451,278 | B2* | 11/2008 | Feind | G06F 12/109 |
| | | | | 711/147 |
| 8,024,405 | B2* | 9/2011 | Shukla | G06F 9/4881 |
| | | | | 709/201 |
| 8,271,763 | B2* | 9/2012 | Nickolls | G06F 12/109 |
| | | | | 711/147 |
| 8,336,056 | B1* | 12/2012 | Gadir | G06F 9/5027 |
| | | | | 718/100 |
| 8,826,305 | B2* | 9/2014 | Filali-Adib | G06F 9/54 |
| | | | | 718/1 |
| 8,874,848 | B2* | 10/2014 | Soundararajan | G06F 12/0813 |
| | | | | 711/122 |
| 9,317,456 | B2* | 4/2016 | Mallick | G06F 13/14 |
| 9,361,118 | B2* | 6/2016 | Hower | G06F 8/436 |
| 9,436,475 | B2* | 9/2016 | Chakrabarti | G06F 9/38 |
| 2003/0229740 | A1* | 12/2003 | Maly | G06F 17/5022 |
| | | | | 710/107 |
| 2011/0289332 | A1* | 11/2011 | Bondalapati | G06F 1/3228 |
| | | | | 713/323 |
| 2012/0297388 | A1* | 11/2012 | Mitchell | G06F 9/485 |
| | | | | 718/100 |
| 2013/0332937 | A1* | 12/2013 | Gaster | G06F 9/50 |
| | | | | 718/104 |
| 2014/0130021 | A1* | 5/2014 | Lin | G06F 9/38 |
| | | | | 717/136 |
| 2016/0154677 | A1* | 6/2016 | Barik | G06F 13/4239 |
| | | | | 718/105 |

OTHER PUBLICATIONS

Wickerson et al., "Remote-Scope Promotion: Clarified, Rectified, and Verified" OOPSLA 2015, Oct. 25-30, 2015.*
Adve, Sarita V. and Mark D. Hill, "Weak Ordering—A New Definition", International Symposium on Computer Architecture (ISCA), Jun. 1990, U.S.A.
Hower, Derek R., et al., "Heterogeneous-race-free Memory Models," The 19th International Conference on Architectural Support for Programming Languages and Operating Systems (ASPLOS-14), Mar. 1-5, 2014, Salt Lake City, Utah, USA.
Hsa Foundation, "HSA Programmer's Reference Manual: HSAIL Virtual ISA and Programming Model, Compiler Writer's Guide, and Object Format (BRIG)," Publication #: 49828, Rev: Version 1.0 (Provisional), Issue Date: Jun. 5, 2014, [Online] Available: http://www.hsafoundation.com/standards/.
"OpenCL 2.0 Reference Pages," [Online] Available: http://www.khronos.org/registry/cl/sdk/2.0/docs/man/xhtml/.
"OpenCL 2.0 Reference Card," [Online] Available: https://www.khronos.org/registry/cl/, Nov. 4, 2013.

* cited by examiner

```
Task steal(Queue *q, Queue_Elem *val) {
    int tail = remoteHead(q->tail);
    int oldHead = q->head;
    if (tail <= oldHead)
        return NULL;
    Task task = q->contents[oldHead];
    int newHead = oldHead + 1;
    if (remoteCAS(&q->head, oldHead, newHead))
        return task;
    return abort;
}
```

FIGURE 8

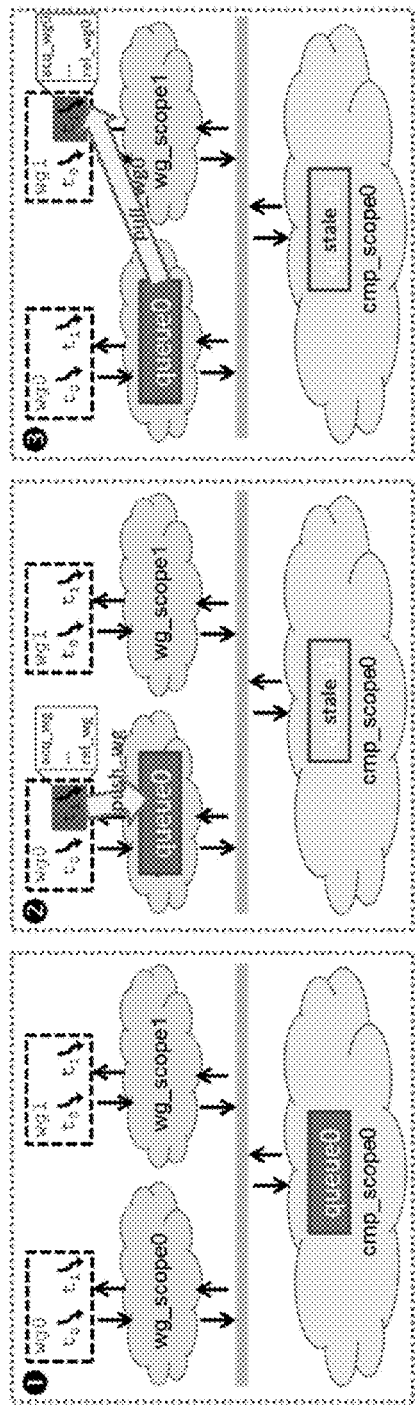

```
int dequeueRemote() {
    uint32_t index = atomic_add_acq_wg(&Q->head, Q->wgID);
    uint32_t size = atomic_ld_rlx_wg(&Q->size, Q->wgID);
    index = index % size;
    return atomic_ld_rlx_wg(&Q->array[index], Q->wgID);
}
```

```
int enqueueRemote(int data) {
    uint32_t index = atomic_add_acq_wg(&Q->tail, Q->wgID);
    uint32_t size = atomic_ld_rlx_wg(&Q->size, Q->wgID);
    index = index % size;
    atomic_st_rlx_wg(&Q->array[index], data, Q->wgID);
    atomic_st_rel_wg(&Q->valid[index], data, Q->wgID);
}
```

FIGURE 11

REMOTE SCOPED SYNCHRONIZATION FOR WORK STEALING AND SHARING

TECHNICAL FIELD

The disclosed embodiments are generally directed to memory operations.

BACKGROUND

As processors evolve to support more threads, synchronizing among those threads becomes increasingly expensive. This is particularly true for massively-threaded, throughput-oriented architectures, such as graphics processing units (GPUs), which do not support central processing unit (CPU)-style "read-for-ownership" coherence protocols. Instead, these systems maintain coherence by "pushing" data to a common level of the memory hierarchy, accessible by all threads, which acts as the global coherence point. After synchronizing, threads must then ensure that they "pull" data from this common memory level, (e.g., by invalidating their caches). For discrete and integrated GPU architectures, the global coherence point occurs at the last level cache (LLC) and at the memory controller, respectively, incurring very high latency. Many applications cannot amortize these high synchronization delays, limiting their performance on GPUs.

Scoped synchronization reduces synchronization latency by partitioning threads into sub-groups called scopes. Threads in the same scope can synchronize with each other through a common, but non-global (i.e., scoped) coherence point. For example, Heterogeneous System Architecture (HSA)—a state-of-the-art specification for devices like those including both a CPU and a GPU, (i.e., a heterogeneous architecture)—extends sequentially consistent for data-race-free (SC for DRF) memory models, (see for example Sarita V. Adve and Mark D. Hill, "Weak Ordering—A New Definition", International Symposium on Computer Architecture (ISCA), June 1990), to include scopes. This new model is called sequentially consistent for heterogeneous race free (SC for HRF), (see for example Derek R. Hower, Blake A. Hechtman, Bradford M. Beckmann, Benedict R. Gaster, Mark D. Hill, Steven K. Reinhardt, David A. Wood, "Heterogeneous-race-free Memory Models," The 19th International Conference on Architectural Support for Programming Languages and Operating Systems (ASPLOS-19), 2014). HSA, (see for example 3, HSA Foundation, "HSA Programmer's Reference Manual: HSAIL Virtual ISA and Programming Model, Compiler Writer's Guide, and Object Format (BRIG)," Publication #: 49828, Rev: Version 1.0 (Provisional), Issue Date: 5 Jun. 2014, [Online] Available: http://www.hsafoundation.com/standards/), and OpenCL 2.0, (see for example "OpenCL 2.0 Reference Pages," [Online] Available: http://www.khronos.org/registry/cl/sdk/2.0/docs/man/xhtml/), introduced more general scoped synchronization primitives based on shared memory acquire/release semantics. For example, in HSA, synchronization operations are tagged with one of the following scope modifiers: work-item (wi) (i.e., GPU thread), wavefront (wv), work-group (wg), component (cmp), or system (sys). Scoped memory operations in HSA can be used to more quickly synchronize with a subset of threads (e.g., same GPU work group).

Scoped synchronization works well for static communication patterns, where producers and consumers have well-defined, stable relationships. That is, scoped memory operations work well for regular workloads where consumer threads are known. However, current SC for HRF models are unable to optimize some important communication patterns, like work stealing. In particular, it works poorly for emerging dynamic workloads, e.g. workloads that use work stealing, where a faster small scope cannot be used due to the rare possibility that the work is stolen by a thread in a distant, slower scope. For example, when a work-item accesses its local task queue, it would like to use a smaller scope (e.g., wg scope) to reduce synchronization overheads. However, when a work-item steals work from another task queue it must use a larger, common scope (e.g., cmp scope). Scoped synchronization requires producers to synchronize at a scope that encompasses all of their consumers. Thus, because a stealer can be any work-item in the GPU, a work-stealing runtime requires all task queue synchronization to occur at component scope. This means that smaller scopes cannot be used to optimize dynamic local sharing patterns like work stealing.

When using scoped memory operations programmers must manage both the visibility of data and the order that it is operated on. This is different than non-scoped operations, which only require programmers to reason about their order. In practice, shared memory models have accommodated scoped semantics, by applying scope modifiers to memory operations. As stated above, in HSA, memory operations are tagged with one of the following scope modifiers: wavefront (wv); work-group (wg); component (cmp); and system (sys). These scope modifiers are generic, meaning that they do not allow different scope instances to be distinguished. A scope instance is a particular instantiation of a scope. This means that for an update on a particular memory address to be visible to a thread, that update must have been "pushed" (i.e. released) to a scope that is associated with (i.e. visible to) that thread. This is because a thread cannot "pull" (i.e., acquire) from a scope-instance that it is not associated with. In other words, HSA defines push-pull semantics that require producers to push data to a scope that they share with their consumers.

These semantics make it difficult to optimize important communication patterns like work stealing, where consumers asynchronously read from producers. In a work-stealing runtime, producers do not know when a subset of their consumers (i.e. the stealers) will read their data; thus, they are forced to conservatively push their data to a scope that is visible to all of their consumers. Otherwise, a stealer may read a stale copy of the data.

SUMMARY OF EMBODIMENTS

Described herein is an apparatus and method for remote scoped synchronization, which is a new semantic that allows a work-item to order memory accesses with a scope instance outside of its scope hierarchy. More precisely, remote synchronization expands visibility at a particular scope to all scope-instances encompassed by that scope. Remote scoped synchronization operations allow smaller scopes to be used more frequently and defer added cost to only when larger scoped synchronization is required. This enables programmers to dynamically optimize the scope that memory operations are performed for important communication patterns like work stealing. Executing memory operations at the optimum scope reduces both execution time and energy. In particular, remote synchronization allows a work-item to communicate with a scope that it otherwise would not be able to access. Specifically, work-items can pull valid data from and push updates to scopes that do not (hierarchically) contain them.

A processing system is described that includes a first scope having a first scope instance and a second scope having a second scope instance, where the first scope instance and the second scope instance are hierarchically unconnected at a respective scope level, and where a work-item in one of the first scope and the second scope is configured to remotely access one of the second scope instance and the first scope instance associated with a remaining one of the first scope and the second scope.

BRIEF DESCRIPTION OF THE DRAWINGS

A more detailed understanding may be had from the following description, given by way of example in conjunction with the accompanying drawings wherein:

FIG. 8 is an example code for work stealing and remote scoped synchronization in accordance with some embodiments;

FIGS. 9A-9C are examples of explicit naming in remote scoped synchronization in accordance with some embodiments;

FIG. 10 is an example chart illustrating different naming combinations for use with remote scoped synchronization in accordance with some embodiments;

FIG. 11 is an example of dequeue and enqueue code for use in remote scoped synchronization in accordance with some embodiments;

DETAILED DESCRIPTION OF THE EMBODIMENTS

For the sake of brevity, conventional techniques related to integrated circuit design, caching, memory operations, memory controllers, and other functional aspects of the systems (and the individual operating components of the systems) have not been described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used in the following description for the purpose of reference only, and thus are not intended to be limiting, and the terms "first", "second" and other such numerical terms referring to structures do not imply a sequence or order unless clearly indicated by the context.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter.

While at least one exemplary embodiment has been presented in the following description, it should be appreciated that a vast number of variations exist. It will also be appreciated that the exemplary embodiment or embodiments described herein are not intended to limit the scope, applicability, or configuration of the claimed subject matter in any way. Rather, the foregoing detailed description will provide those skilled in the art with a guide for implementing the described embodiment or embodiments. It will be understood that various changes may be made in the function and arrangement of elements without departing from the scope defined by the claims.

Figure 1:
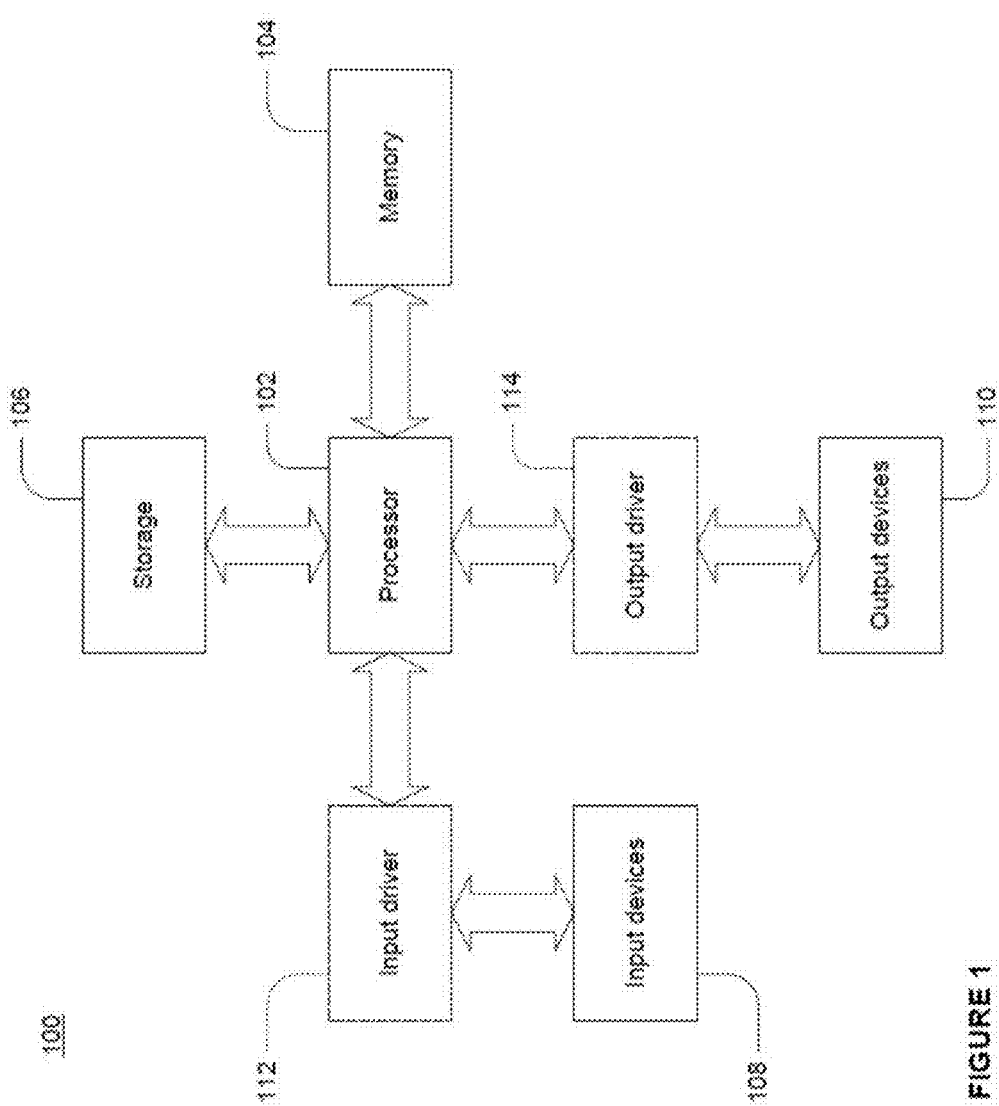
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
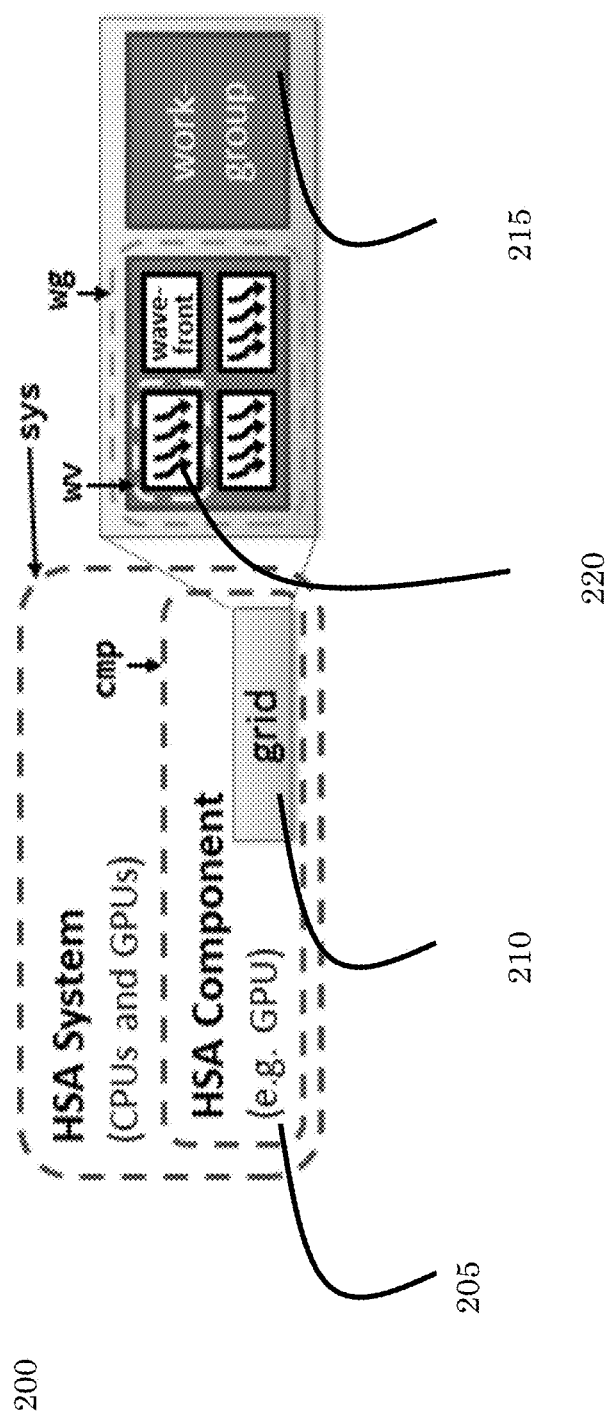
FIG. 2 is an example Heterogeneous System Architecture (HSA) of work-items in accordance with some embodiments.

For purposes of understanding and illustration, a description of the GPU architecture and memory and how it relates to the Heterogeneous System Architecture (HSA) model is presented. The GPUs attain high throughput by targeting massively parallel code segments that can be executed by thousands of threads. The GPU programming model incorporates hierarchy to help programmers organize threads, called work-items in HSA and OpenCL, in a GPU-efficient way. FIG. 2 labels each level of the work-item hierarchy with its corresponding scope and FIG. 3 shows how these scopes are typically mapped to hardware.

FIG. 2 shows the HSA hierarchy of work-items. An HSA system 200 is composed of one or more HSA components (cmp) 205, defined, for example, as a GPU herein. The GPUs execute grids 210, which are sets of work-items that execute the same function at the same time. This organization, called single instruction multiple thread (SIMT), helps GPUs operate efficiently. The work-items within a grid 210 are sub-divided into work-groups (wg) 215. Work-items within a work-group 215 are scheduled together and can communicate with each other much faster than with work-items in other work-groups. Finally, an HSA component dynamically partitions work-groups into even smaller sets, called wavefronts (wv) 220, to match the GPU's execution width.

Figure 3:
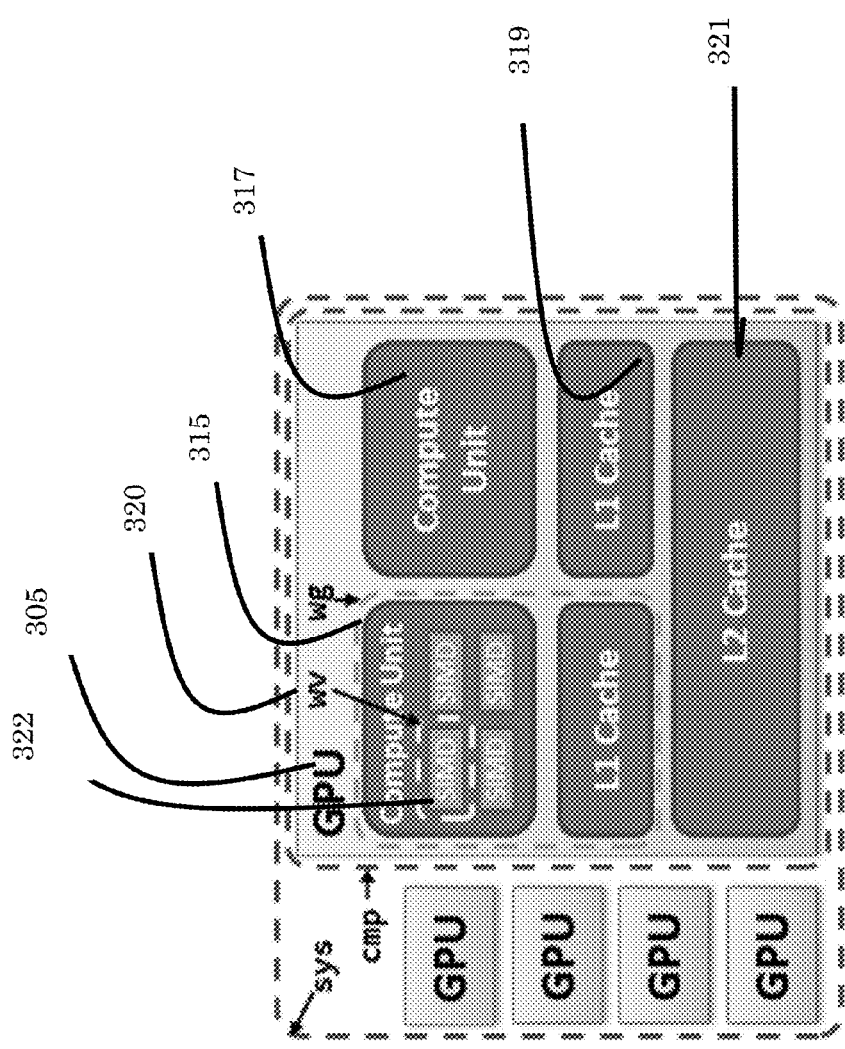
FIG. 3 is an example graphics processor unit (GPU) architecture mapped to FIG. 2 in accordance with some embodiments.

The example HSA-compatible GPU architecture illustrated in FIG. 3 corresponds to the software hierarchy of work-items. The wavefronts 320 execute on single instruction multiple data (SIMD) units 322, which are sets of functional units that typically execute in lockstep. The work-groups 315 execute on compute units (CU) 317, which are composed of multiple SIMD units 322 (four shown). Typically each CU 317 also includes a private L1 data cache 319. The CUs 317 within a GPU 305 share a common L2 cache 321 that is used to communicate among work-items within a grid (not shown). The cache configuration shown in FIG. 3 is illustrative only and other configurations are also applicable.

HSA uses acquire/release semantics to ensure that data is visible after synchronization. Informally, consumer work-items execute an acquire operation to "pull" the most recent copy of memory and producer work-items execute a release operation to "push" their updates to consumers. It is common to label a synchronizing load instruction with acquire semantics (called load acquire) and a synchronizing store with release semantics (called store release).

HSA extends acquire/release semantics by applying scopes to them. Specifically, as shown above, HSA defines the following scopes: work-item (wi), wavefront (wv), work-group (wg), component (cmp), and system (sys). The scopes can be applied to synchronization operations to limit the depth of the hierarchy that they synchronize to. For example, a wg-scoped release operation will complete once all prior writes have reached their respective work-group's L1 cache (and all prior loads are done).

The GPUs use simple write-through mechanisms to implement a relaxed memory consistency model. This throughput-oriented approach avoids invalidation traffic and simplifies the hardware. For example, consider AMD's GPU architecture included in its Radeon® HD 7900, (which is based upon a GPU architecture referred to as "Graphics Core Next 1.0" or codename "Southern Islands"), which allows stores to complete without waiting for coherence operations and tracks dirty data at the byte granularity. In comparison, CPU memory models tend to be stronger and their implementations typically maintain the single-writer/multiple-reader invariant. The CPU caches enforce this invariant by issuing cache-block-granular invalidation messages to write-back caches. In this procedure, often referred to as "Read for Ownership" coherence, a writer reads the cache block and waits for its invalidation messages to be acknowledged, thus ensuring that it has exclusive ownership before writing the block.

In contrast, GPUs do not wait for exclusive access before writing a block, which allows them to achieve high throughput using a relatively simple microarchitecture. The drawback is that synchronization operations can be expensive. In particular, release operations must wait until all prior writes reach the correct scope. Naïvely this can be performed by tracking each outstanding write and waiting for them to complete. A better approach uses a First In, First Out hardware queue (FIFO) at each cache level to track dirty addresses. This technique is demonstrated in FIGS. 4A and 4B.

Figures 4A, 4B:
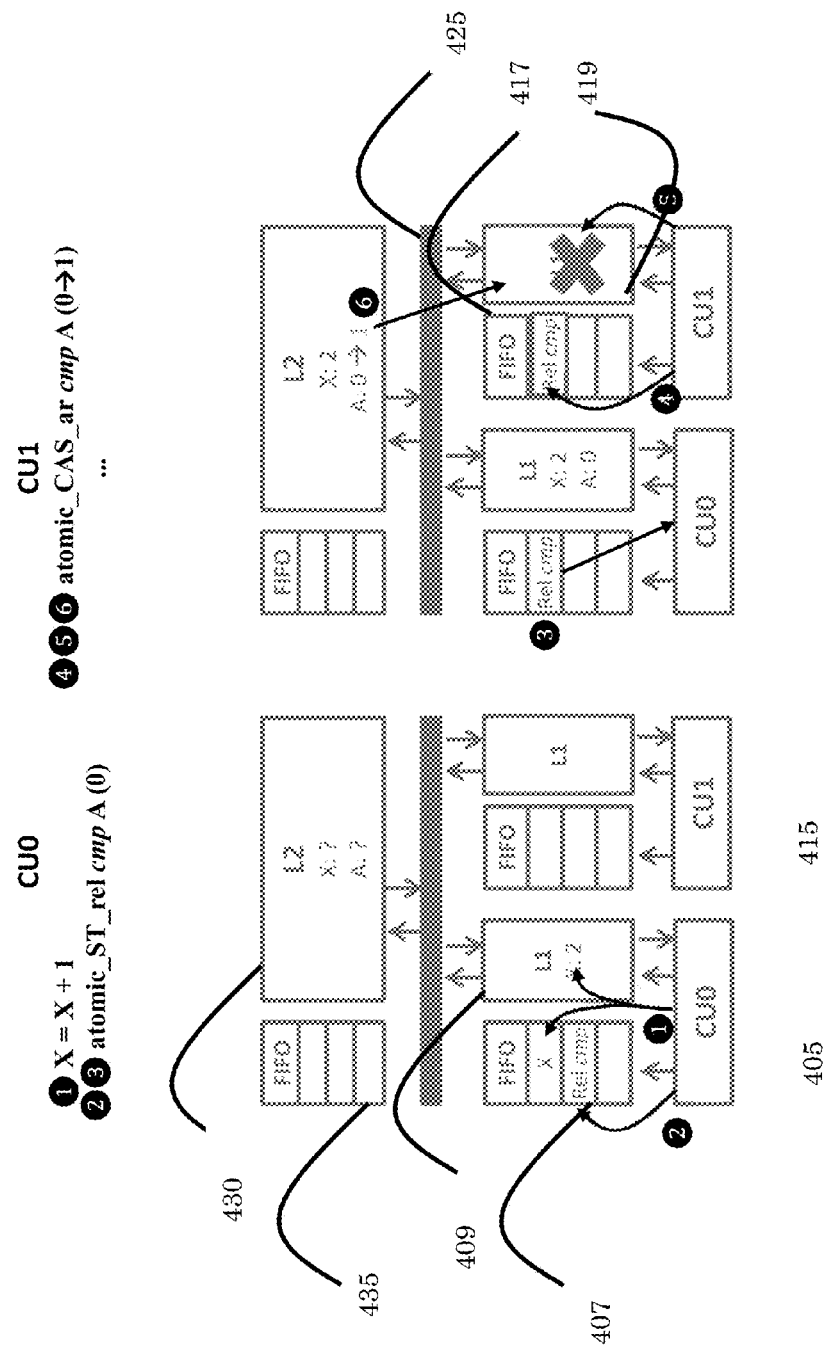
FIGS. 4A and 4B are an example system for memory operations in accordance with some embodiments.

FIGS. 4A and 4B show an example system including a CU 0 405 in communication with a FIFO 407 and a L1 cache 409, a CU 1 415 in communication with a FIFO 417 and a L1 cache 419. The caches 409 and 419 are in communication with a L2 cache 430 via a bus 425. The L2 cache 430 has an associated FIFO 435.

Every write by CU 0 (405) inserts its address at the FIFO's tail (407) (time 1), and when an address reaches the FIFO's head, its associated cache block is written to the next level of the hierarchy (if necessary). By using this FIFO approach, independent writes can combine at each level of the cache hierarchy. The release operations are handled by simply inserting write markers into the FIFO 407 (time 2); the release completes when all prior addresses in the FIFO 407 are written through to the appropriate scope (time 3) and the marker reaches the FIFO's head.

For purposes of illustration, some of the embodiments described herein assume acquire operations simply invalidate all caches encompassed by the acquire operations' scope. The cache invalidates effectively "pull" the latest version of data from the distant levels of the memory hierarchy by removing closer cached data that has become stale. The invalidations themselves are cheap, (i.e. a single-cycle flash-invalidate), but they decrease the effectiveness of caching and cause unnecessary inter-wavefront interference. Referring to FIG. 4B, the CU 1 415 performs an acquire operation by invalidating its L1 cache 419 (time 4). The compare-and-swap (CAS) operation is performed at the operation's respective scope. Specifically, the L2 cache controller 430 reads (time 5) and writes (time 6) address A.

Figures 5A, 5B, 5C:
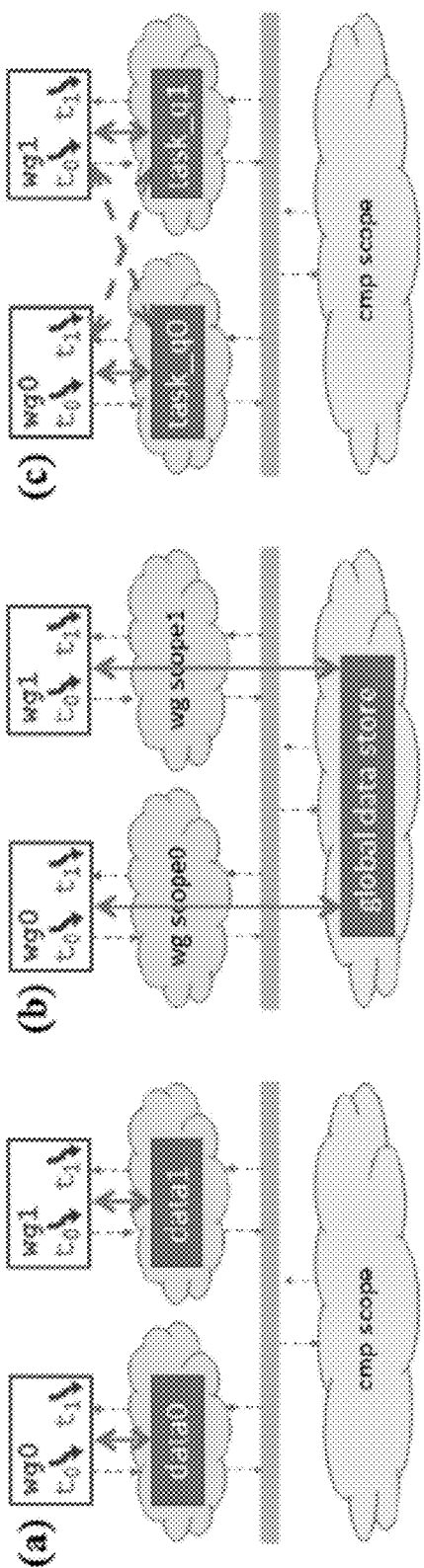
FIGS. 5A-5C are examples of scoped operations in accordance with some embodiments.

Given this background, it is noted that scoped synchronization works well for static communication patterns, where producers and consumers have well-defined, stable relationships. That is, scoped memory operations work well for regular workloads where consumer threads are known. For example, FIG. 5A depicts a static local sharing pattern, where two OpenCL work-groups, wg0 and wg1, operate on separate data (data0 and data1, respectively). The work-group wg0 uses wg-scoped synchronization to coordinate operations on data0. The wg-scoped operations are appropriate because only work-items from work-group wg0 operate on data0. Similarly, work-group wg1 uses wg-scoped synchronization to operate on data1.

In another example, a larger scope (i.e., cmp scope) is required when data is shared dynamically across all GPU work-items. An example of this communication pattern, termed herein as dynamic global sharing, is shown in FIG. 5B. In this scenario, wg0 and wg1 read and write a global data store. Component scoped synchronization is required to guarantee that data updates are "pushed" to the global data store, where they are visible to all consumers.

A third sharing pattern, shown in FIG. 5C, is dynamic local, which occurs when a subset of work-items frequently access data within a smaller scope, but non-local work-items occasionally desire access as well. A common example of dynamic local sharing is work stealing, a scheduling policy that provides dynamic load balancing. As shown, work-groups wg0 and wg1 are mostly accessing their local task queues: task_q0 and task_q1, respectively. When a work-item finds its local task queue empty, it attempts to steal work from another task queue in the system. Work stealing allows work-items to exploit locality when frequently accessing their own task queue, while also allowing work-items to steal tasks to mitigate load imbalance.

Scoped synchronization, as currently defined in HSA and OpenCL 2.0, cannot efficiently support dynamic local sharing. To understand why, consider the work-stealing scenario depicted in FIG. 5C. There are two scenarios to consider. First, when a work-item accesses its local task queue, it would like to use a smaller scope (i.e., wg scope) to reduce synchronization overheads. However, when a work-item steals work from another task queue it must use a larger, common scope (i.e., cmp scope). Scoped synchronization requires producers to synchronize at a scope that encompasses all of their consumers. Thus, because a stealer can be any work-item in the GPU, a work-stealing runtime requires all task queue synchronization to occur at component scope. This means that smaller scopes cannot be used to optimize dynamic local sharing patterns like work stealing.

Figures 6A, 6B, 6C:
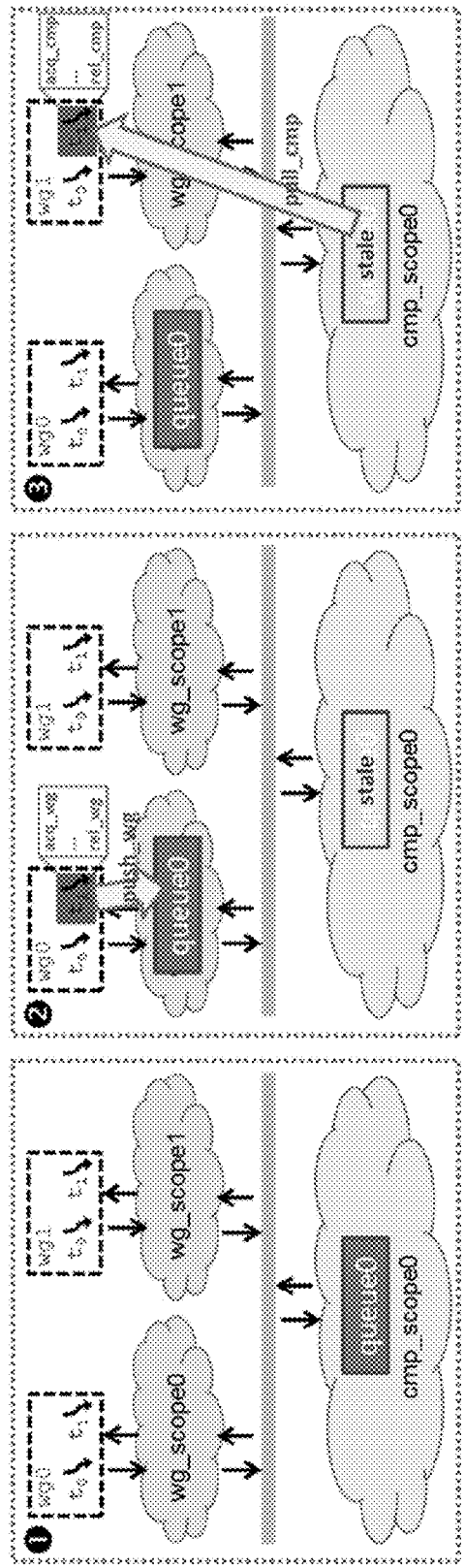
FIGS. 6A-6C are examples of scoped operations in accordance with some embodiments.

Scoped synchronization is an exciting development in GPU programming models. Unfortunately, it currently suffers some severe programming limitations. This conundrum is demonstrated in FIGS. 6A, 6B and 6C. In FIG. 6A, a queue (queue0) is instantiated for work-group 0 (wg0) in the component scope. In the common case, wg0 is the only work-group that reads and writes queue0. The programmer would like to use work-group scope operations to operate on queue0 with wg0, as shown in FIG. 6B. Unfortunately, doing so would preclude a different work-group from stealing data from queue0 when its queue becomes empty. For example, if work-group 1 (wg1) were to read from queue0, as shown in FIG. 6C, it would read stale data from the component scope. Note that wg1 cannot use memory operations that are work-group scoped because they would operate on wg1's scope instance (not wg0's). It is important to note that the sequence of events in FIGS. 6A-6C would be correct in the absence of scopes. For example, in a traditional SC for DRF memory model, a release operation would make data visible to all threads in the system (i.e., all pushes and pulls would occur at on a global scope).

As noted herein, HSA requires producers to push shared data to a scope that encompasses all possible consumers. This is because consumer work-items are only able to synchronize with data in their own scope instance. To improve performance for important communication patterns, that exhibit dynamic-local sharing as described herein above, it would be better if producers could operate on a scope that encompasses the most frequent consumers, but not necessarily all possible consumers. Scoped synchronization, as defined in HSA and OpenCL, implicitly targets scope instances within the caller's scope hierarchy. A key insight is that extending this semantic to allow synchronization beyond the caller's scope hierarchy enables better use of scopes.

Described herein is an apparatus and method for remote scoped synchronization, which is a new semantic that allows a work-item to order memory accesses with a scope instance outside of its scope hierarchy. More precisely, remote synchronization expands visibility at a particular scope to all scope-instances encompassed by that scope. Remote scoped synchronization operation allows smaller scopes to be used more frequently and defers added cost to only when larger scoped synchronization is required. This enables programmers to optimize the scope that memory operations are performed at for important communication patterns like work stealing. Executing memory operations at the optimum scope reduces both execution time and energy.

Remote synchronization allows a work-item to communicate with a scope that it otherwise would not be able to access. Specifically, work-items can pull valid data from and push updates to scopes that do not (hierarchically) contain them. In other words, when scopes are hierarchically unconnected, i.e., the scopes are not connected at their scope-to-scope or peer-to-peer level, remote scoped synchronization provides access and synchronization between the scopes. While remote synchronization may place some additional burden on both programmers and hardware, remote scoped synchronization provides robust performance improvements across a diverse set of program behaviors.

Figure 7:
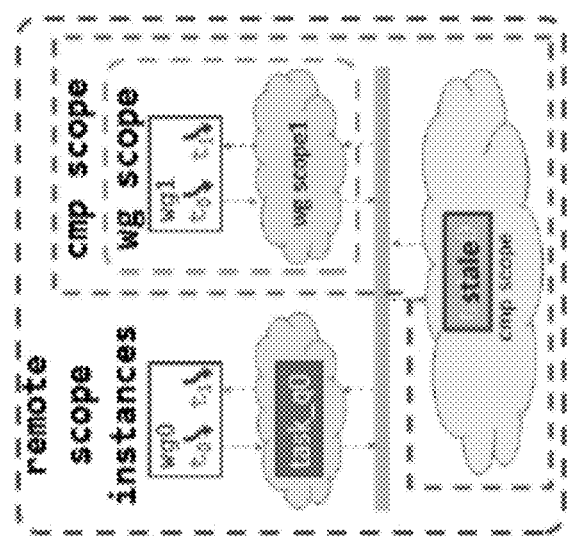
FIG. 7 is an example illustration of a remote component scope in accordance with some embodiments.

In general and described in greater detail herein below, FIG. 7 shows how remote synchronization enables the optimal use of scopes for the dynamic local sharing pattern depicted in FIGS. 6A-6C. As shown, the work-group wg0 uses low-latency work-group scoped synchronization to operate on task_q0, (referred to as queue0 above). Meanwhile, work-group wg1 can now read and write task_q0 using remote synchronization to the component scope, which provides access to the remote scope instances included in its cmp scope. This is an example of imprecise naming as described herein below. Moreover, FIG. 8 provides an embodiment of code related to work-stealing and remote scoped synchronization. In particular, the code shown in FIG. 8 is lock-free code for stealing an element from a queue and is part of a work-stealing algorithm. The code is augmented with remote synchronization identified with underline. Importantly, the difference is that the synchronization memory operations are replaced with remote operations. Described herein below is how these new remote operations are implemented by the instruction set architecture (ISA).

Described herein are some embodiments for implementing remote scope synchronization that allows a consumer to retrieve its version of the data from a scope instance outside of its own scope instance hierarchy. Three memory ordering semantics are described that encapsulate remote scoped synchronization.

Described herein is an overview of remote scoped synchronization operation. As noted, HSA requires that producers operate on a scope that encompasses all possible consumers. This is because consumers are only able to pull (i.e., acquire) data from a scope instance that exists in that consumer's scope instance hierarchy. For important communication patterns, like work stealing, it would be better if producers could operate on a scope that encompasses the most frequent consumers.

In HSA, scoped memory operations implicitly operate on the executing thread's scope instance. It is observed that if the scope instance targeted by a memory operation was specified explicitly (instead of implicitly), programmers would be able to use scopes more flexibly. Thus, described herein is a set of programming interfaces that allow a consumer to name the scope instance that it wishes to target.

FIGS. 9A, 9B and 9C demonstrate how explicit naming enables better utilization of scopes. FIG. 9A illustrates that a queue (queue0) is instantiated for work-group 0 (wg0) in the component scope. FIG. 9B shows that the work-group wg0 enqueues work onto queue0 using work-group scope operations. The up-to-date version of queue0 is in wg0's work-group scope instance and the version in the component scope instance is stale. FIG. 9C shows that work-group wg1 dequeues work from queue0 using remote scoped synchronization that explicitly name wg0's work-group scope instance.

Described herein is the remote scoped synchronization design space. Implementations of remote synchronization operations are defined by two high-level attributes: 1) moving data vs. moving computation; and 2) Precise vs. imprecise naming. With reference to attribute 1, (moving data vs. moving computation), remote scoped synchronization may occur by moving the computation, (i.e. the memory operation), to the data, or moving the data to the computation. With reference to attribute 2, a thread may directly name the target scope instance, (e.g. wg0's work-group scope instance), or imprecisely name it, (e.g. some work-group scope instance).

The cross product of these two attributes, depicted in FIG. 10, suggests four remote synchronization implementations: 1) precise naming/move computation; 2) precise naming/ move data; 3) imprecise naming/move data; and 4) imprecise naming/move computation. The first three implementation embodiments are described herein below.

Described herein are the interfaces that may be used for remote scoped synchronization. A simplified version of the syntax for atomic memory operations in HSA Intermediate Language (HSAIL), (an assembly language), is shown below:
 atomic_op_order_scope dest, address, (src) where the different modifiers and operands in the syntax are:
op: The memory operation (e.g. ld, st, cas, add, etc.);
order: The order of the memory operation as defined in the HSAIL specification (e.g. rlx, acq, rel, ar);
scope: The target scope of the memory operation (e.g. wv, wg, cmp, sys); dest: A destination register for the return value;
address: A virtual memory address; and
(src): An optional number of source registers used as input to carry out the operation.

In an embodiment, an interface for precise naming may be implemented by extending the HSAIL syntax to accommodate remote scoped synchronization operations with precise naming semantics by adding an optional scope instance ID operand:
 atomic_op_order_scope dest, address, (src), (scopeInstanceID)
where scopeInstanceID is the name of the target scope.

Imprecise naming leverages hierarchical memory that provides transitivity. Specifically, it introduces "scope promotion," which allows a work-item to "promote" the scope of another work-item's acquire and/or release operations. For an acquire operation to synchronize with a previous release operation, both operations are of the same scope. Alternatively, one operation must be remote-scoped to promote the pair to a common scope as described below. For example, a remote acquire operation may be performed which makes data ordered by the prior paired release visible by promoting the scope of the prior release to match the scope of this remote acquire. In another example, a remote release operation makes data ordered by this release visible to the next paired acquire by promoting the scope of the next acquire to the scope of this remote release. In another example, globally order all read-modify-writes at the remote scope. The flow charts shown in FIGS. 15, 16, and 17, and explained later herein, depict embodiments where these scope promotions are achieved through broadcast based cache flushes and invalidates.

In an embodiment of imprecise naming, an interface for imprecise naming may be implemented by extending the HSAIL syntax to accommodate remote scoped synchronization operations with imprecise naming semantics by adding a context (ctx) modifier to the instruction:
 atomic_op_order_scope_ctx dest, address, (src)
where ctx may be either local or remote. For example, if ctx is remote and the memory order is acquire, the hardware will broadcast a command that forces all other scope instances that are visible from scope to flush their data to scope. For example, if scope is cmp, then all wg and wv scope instances connected to the requestor's cmp scope will flush their data to the requestor's cmp scope. If ctx is local, then operation proceeds as normal. For example,
 atomic_ld_acquire_cmp_local r1, 0xABCD
would invalidate the appropriate L1 cache and then load address 0xABCD into r1 from the L2 cache (or deeper in the memory hierarchy if necessary).

FIG. 11 illustrates how remote scoped synchronization operations are implemented using pseudo-code for remote dequeue and remote enqueue routines. The remote dequeue routine increments the head pointer of the queue and then the prior value of head is used to retrieve the data. Similarly, the enqueue routine increments the queue's tail, uses the prior tail value to write new data into the queue, and finally marks a valid bit for the queue entry. To simplify the example, neither routine handles overflow, underflow, or wraparound. The sequence of load and store operations is the same that would occur in non-remote versions of these routines. What differs is the flavor of load/store (ld/st) instructions that are used. In this example every memory operation uses the syntax that we defined for precise naming to ensure that the correct version of the data is operated on. Specifically, the term "wgID" is used to precisely name the target scope instance.

In an implementation that uses precise naming, threads read from a scope instance outside of their scope instance hierarchy by explicitly naming the target scope instance. The intuition here is that some entity (e.g. a work-group) logically owns the data. Thus, if an entity other than the data's owner wishes to operate on the data, it can do so through the owner's scope instance. Precise naming burdens the programmer by requiring them to determine which scope instance to use for a remote operation. This burden can be eliminated through imprecise naming. In imprecise naming, a program specifies the remote scope (e.g. work-group) and the hardware or runtime resolves which scope instance contains the data.

Precise naming also requires a mechanism to map a software scope instance to its hardware counterpart. This is because programmers use software labels, usually assigned by the runtime, to reference different execution entities, (e.g. local and global IDs in OpenCL). Programming languages expose software identifiers to differentiate different entities (e.g. wg0 vs. wg1). Software identifiers decouple an entity from the hardware that it runs on. Precise naming requires a mechanism to translate between the software identifier (e.g. wg0) of the entity that owns the data and the hardware domain (e.g. compute unit 0, or CU0) that the entity is scheduled on.

Described herein is an example method for translating the software labels to their respective hardware scope instances. The translation can be managed by the front-end scheduling logic. The translations can be saved to memory or to a dedicated hardware table. In a memory embodiment, the runtime can manage the translation through memory. In this scheme, it pre-allocates a table for the translations at kernel launch and populates the table as it schedules work-groups. When the compiler or finalizer encounters a software label it inserts the necessary instructions to translate the label via the table in memory. In a kernel hardware context, the GPU maintains some hardware state for each kernel. This state is extended to include a hardware table for the translations. This table is managed by the work-group scheduler and referenced by remote scoped synchronization operations. The table should be sized to accommodate the maximum number of concurrent work-groups supported by the GPU. If an entry is not found in the table then heterogeneous-race-free (HRF) semantics ensure that the largest scope has the data.

If a software entity migrates (e.g. wg0 moves from compute unit 0 to compute unit 1), then the translation must be updated accordingly. Also, a device that supports remote synchronization and allows software entities to migrate should provide a mechanism to temporarily disable migrations. This allows a thread to prevent the remote entity from migrating during the brief time quantum that it is remotely accessing that entity's data. In another embodiment, translation can be avoided by naming hardware scopes directly.

Described herein is an embodiment of a precise naming/move computation implementation. An implementation that moves the computation relies on the remote controller (e.g. compute unit 0's L1 cache controller) to carry out the remote synchronization operation. This works because the remote controller is the ordering point for all memory operations to its respective scope instance and can resolve where the address of interest is.

Figure 12:
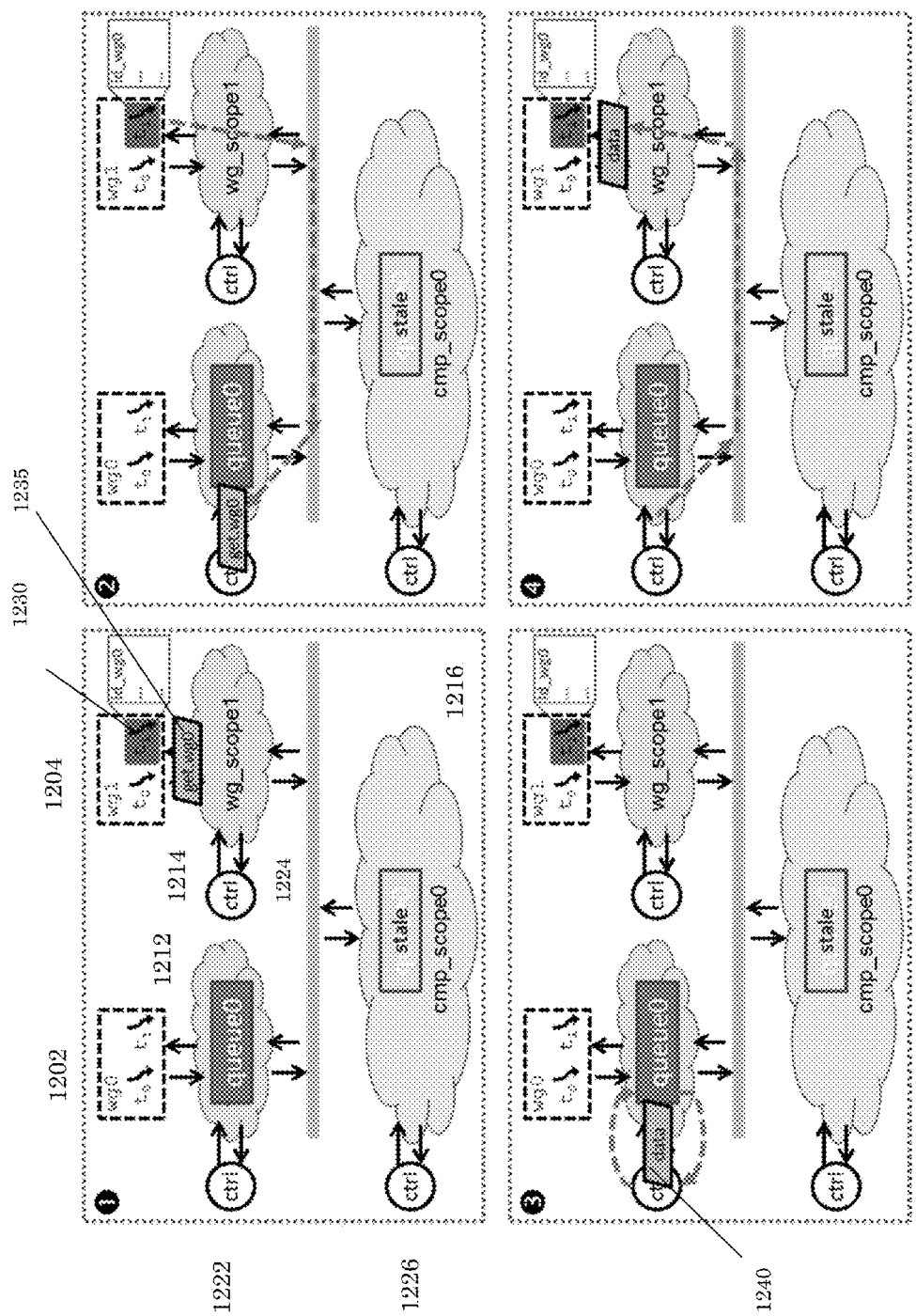
FIG. 12 is an example of precise naming/computation move for use in remote scoped synchronization in accordance with some embodiments.

FIG. 12 illustrates the sequence of events to move a computation using precise naming to a remote controller. FIG. 12 may include a work-group 0 (wg0) 1202, a work-group 1 (wg1) 1204, a wg0 scope instance 1212, a wg1 scope instance 1214 and a component scope instance 1216. A controller is associated with each of wg0 scope instance 1212, wg1 scope instance 1214 and component scope instance 1216, namely, controller 1222, controller 1224 and controller 1226, respectively. FIG. 12 illustrates using a standard on-chip network designed for normal memory operations. Alternatively, a network dedicated for remote operations may be used.

In scene 1, a requestor 1230, thread 1 from work-group 1 1204 in this example, forms a memory packet 1235 for the remote operation. The memory packet 1235 encodes the address of interest, destination scope instance, and any other information required by the operation. In scene 2, the memory packet 1235 navigates the on-chip network and finds its way to a remote controller, which in this instance is controller 1222. In scene 3, the remote controller (controller 1222) executes the memory operation and in scene 4, the remote controller (controller 1222) sends a response packet 1240 back to the requestor 1230.

A moving computation can occur at different granularities. A single operation (in an embodiment) can be moved or an atomic transaction that comprises a sequence of operations. Support for transactions may be more invasive. For example, the remote controller could be extended to sequence through the transaction's operations, or a remote thread could execute an interrupt handler.

Described herein is an embodiment of a precise naming/move data implementation. In this embodiment, moving the data pushes any versions that are privately cached by the remote scope instance to a shared scope, i.e., the moving flushes the scope instance. This may be achieved by sending a flush memory packet to the remote memory scope.

Figure 13:
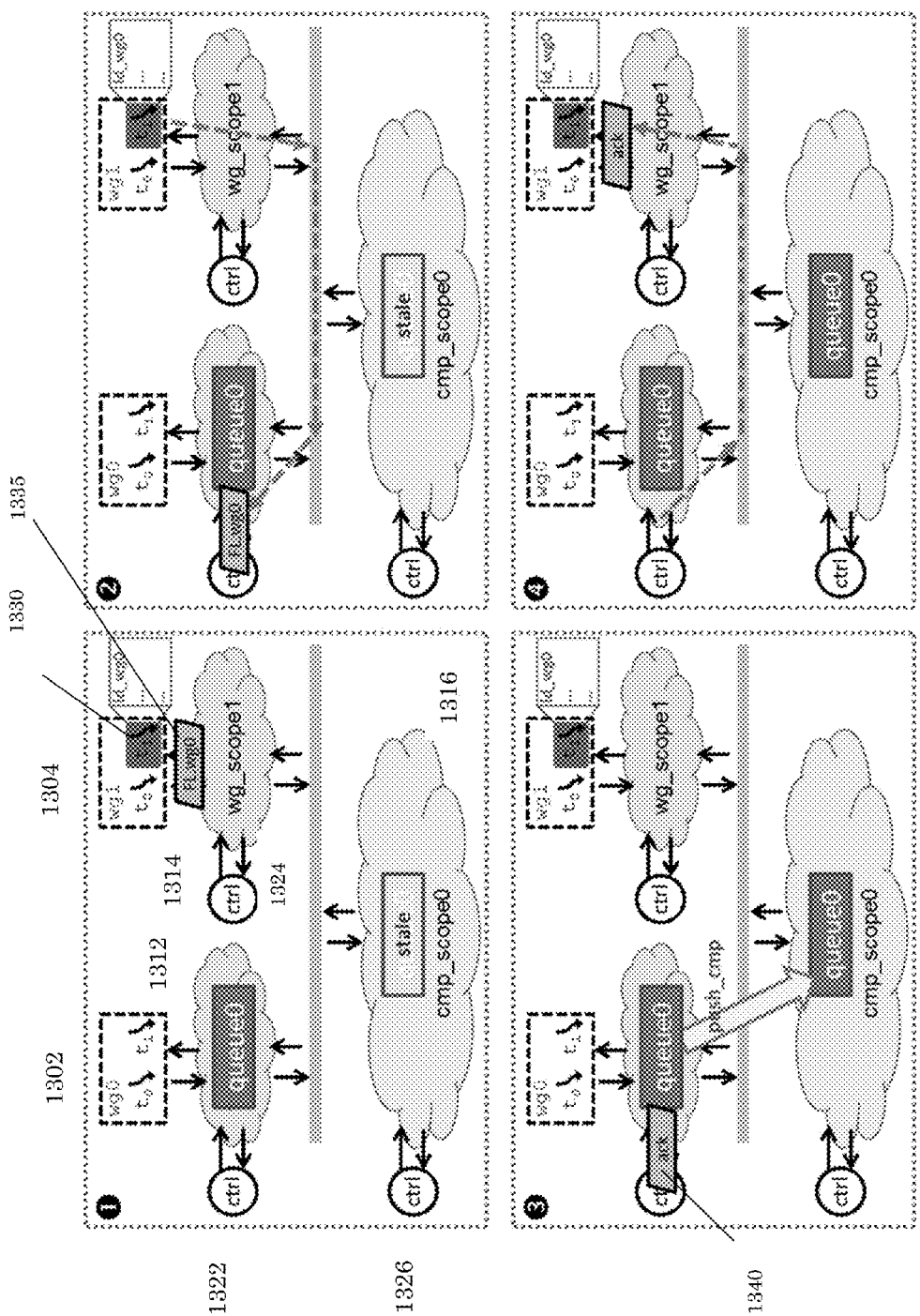
FIG. 13 is an example of precise naming/data move for use in remote scoped synchronization in accordance with some embodiments.

FIG. 13 illustrates a sequence of events to move data to a remote memory scope. FIG. 13 may include a work-group 0 (wg0) 1302, a work-group 1 (wg1) 1304, a wg0 scope instance 1312, a wg1 scope instance 1314 and a component scope instance 1316. A controller is associated with each of wg0 scope instance 1312, wg1 scope instance 1314 and component scope instance 1316, namely, controller 1322, controller 1324 and controller 1326, respectively. As before, FIG. 13 illustrates using a standard on-chip network designed for normal memory operations. Alternatively, a network dedicated for remote operations may be used.

In scene 1, a requestor 1330, thread 1 from work-group 1 1304 in this example, forms a flush packet 1335 for the remote operation. The flush packet 1335 encodes the address of interest, destination scope instance, and any other information required by the operation. In scene 2, the flush packet 1335 navigates the on-chip network and finds its way to a remote controller, which in this instance is controller 1322. In scene 3, the remote controller (controller 1322) flushes its privately cached data to a scope that it shares with the requestor 1330, (component scope instance 1316 in this example), and sends an acknowledgement 1340. In an embodiment, an optimization may include merging a read-modify-write with a flush packet and execute the merged operation at the remote controller. This can avoid unnecessary flushes and eliminates the potential for some race conditions. Finally, in scene 4, the acknowledgement 1340 arrives at the requestor 1330 signaling that the requestor 1330 can move forward with the memory operation.

Moving the data requires less messaging between the requestor and the remote scope instance because the remote controller is only responsible for a single operation (the flush). This comes at the expense of inter-wave interference at the remote scope. Inter-wave interference occurs because data that is privately cached in the remote scope, but not relevant to the remote operation, is flushed.

Described herein is an embodiment of imprecise naming/move data implementation. The use of imprecise naming simplifies using remote operations because programmers only need to identify that a remote operation is necessary and at which scope, but does not need to identify which remote scope instance to target.

Figure 14:
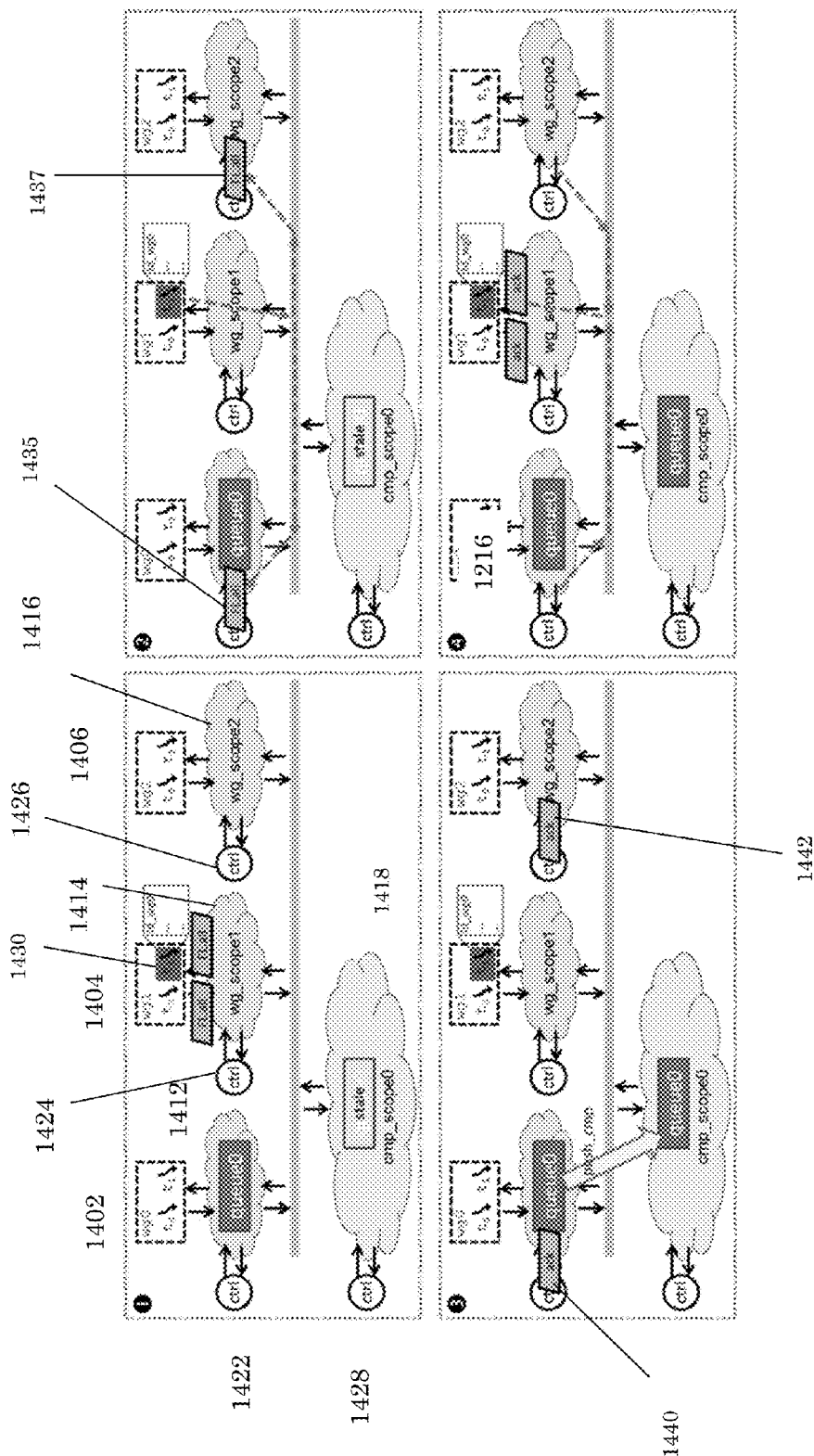
FIG. 14 is an example of imprecise naming/computation move for use in remote scoped synchronization in accordance with some embodiments.

FIG. 14 illustrates the sequence of events to move a computation using imprecise naming to a remote controller. This implementation is similar to the precise naming/move data implementation described herein. The primary difference is that the requestor generates a flush packet for every remote scope instance (instead of a single flush packet).

FIG. 14 may include a work-group 0 (wg0) 1402, a work-group 1 (wg1) 1404, a work-group 2 (wg2) 1406, a wg0 scope instance 1412, a wg1 scope instance 1414, a wg2 scope instance 1416 and a component scope instance 1418. A controller is associated with each of wg0 scope instance 1412, wg1 scope instance 1414, wg2 scope instance 1416 and component scope instance 1418, namely, controller 1422, controller 1424, controller 1426 and controller 1428, respectively. As before, FIG. 14 illustrates using a standard on-chip network designed for normal memory operations. Alternatively, a network dedicated for remote operations may be used.

In scene 1, a requester 1430, thread 1 in work-group 1 1404, generates two flush packets 1435 and 1437, to send to other work-group scope instances in the system. In this example, the other work-group instances are wg0 scope instance 1412, and wg2 scope instance 1416. In scene 2, the flush packets 1435 and 1437 arrive at their target work-group scope instances, (i.e., wg0 scope instance 1412, and wg2 scope instance 1416), and queue themselves up for processing by the appropriate controllers, (i.e., controller 1422, and controller 1426 in this example). In scene 3, data (including queue0) that is cached in the remote work-group scope instances, (i.e., wg0 scope instance 1412, and wg2 scope instance 1416), is flushed to the component scope 1418. Finally, in scene 4, acknowledgement packets 1440 and 1442 are received by the requestor 1430 signaling that it can operate on the component scope 1418.

The imprecise naming implementation is amenable to the same optimizations as the precise naming/move data implementation. Specifically, in an embodiment, a read-modify-write may be coupled with a flush packet, and conditionally execute the flushes. Another observation about the imprecise naming implementation is that it might not scale as well as precise naming and requires longer latency. For example, if there were another component scope in the system, then a flush packet would need to be generated for all of its work-group scope instances and the flushes would need to propagate out to the device (system or higher) scope to encompass both component scopes. The imprecise-named remote synchronization operations must wait for all acknowledgements before completing. This long latency can hinder the remote requestor because its subsequent read-modify-write operations (e.g. updating a work queue pointer) cannot be issued until the prior remote synchronization operation completes. The result is the remote requestor can be either starved out by other requests or the remote operation could be incorrectly ordered with respect to other synchronization. There are many possible ways to solve this issue including adding a mechanism where hardware allows only the remote requestor to access the data for a short amount of time. Alternatively, the hardware can guarantee that the next entity to operate on the data after all acknowledgements are collected is the remote requestor.

Described herein is an embodiment of imprecise naming. As stated herein above, embodiments of remote scoped synchronization allow a work-item to pull and push data from a scope outside of its scope instance hierarchy without requiring a specific scope instance to be explicitly identified. Instead, programmers only need to identify the common scope a work-item shares with the target scope instance in which the data resides.

Implementation of remote scoped synchronization requires extension of current GPU instruction sets to support remote scoped synchronization. Current GPU instruction sets already support various types of scoped synchronization. For instance, the HSAIL specification defines order and scope modifiers across many different types of memory instructions. Examples of the current HSAIL syntax for atomic memory operations were shown herein above: The HSAIL syntax may be extended to accommodate remote scoped synchronization by adding three new memory orders: 1) Remote acquire (rm_acq); 2) Remote release (rm_rel); and 3) Remote acquire+release (rm_ar).

Application of the remote acquire (rm_acq) memory order to load instructions allows consumer, (requestor as used above), work-items to pull data produced by any scope instance, even if the producer, (remote controller as used above), used scoped synchronization outside of the consumer's scope hierarchy. Application of the remote release (rm_rel) memory order to store instructions allows producer work-items to push data to external scope instances, even if the consumers use scoped synchronization outside of the producer's scope hierarchy. Application of remote acquire+release (rm_ar) to read-modify-write instructions allows work-items to pull and push data from/to external scope in-stances.

Implementing each remote order in a GPU can be thought of in terms of sub-operations. This sequence of sub-operations ensures that proper synchronization is maintained without directly involving the remote compute units. Each of the above remote orders are described herein below.

Remote acquire ordering ensures writes performed by the remote scope instances are guaranteed to be seen by the requestor. The memory order begins by performing a flush operation across all remote scope instances that are inclusive with the specified scope. For example, if the scope is cmp, then all wg and wv scope instances inclusive with respect to the requestor's cmp scope instance will flush their dirty data to the shared cmp scope. Once these remote writes are complete, the requestor performs an invalidate operation to the specified scope. Finally, the instruction completes by performing the actual memory operation, such as a load.

Figure 15:
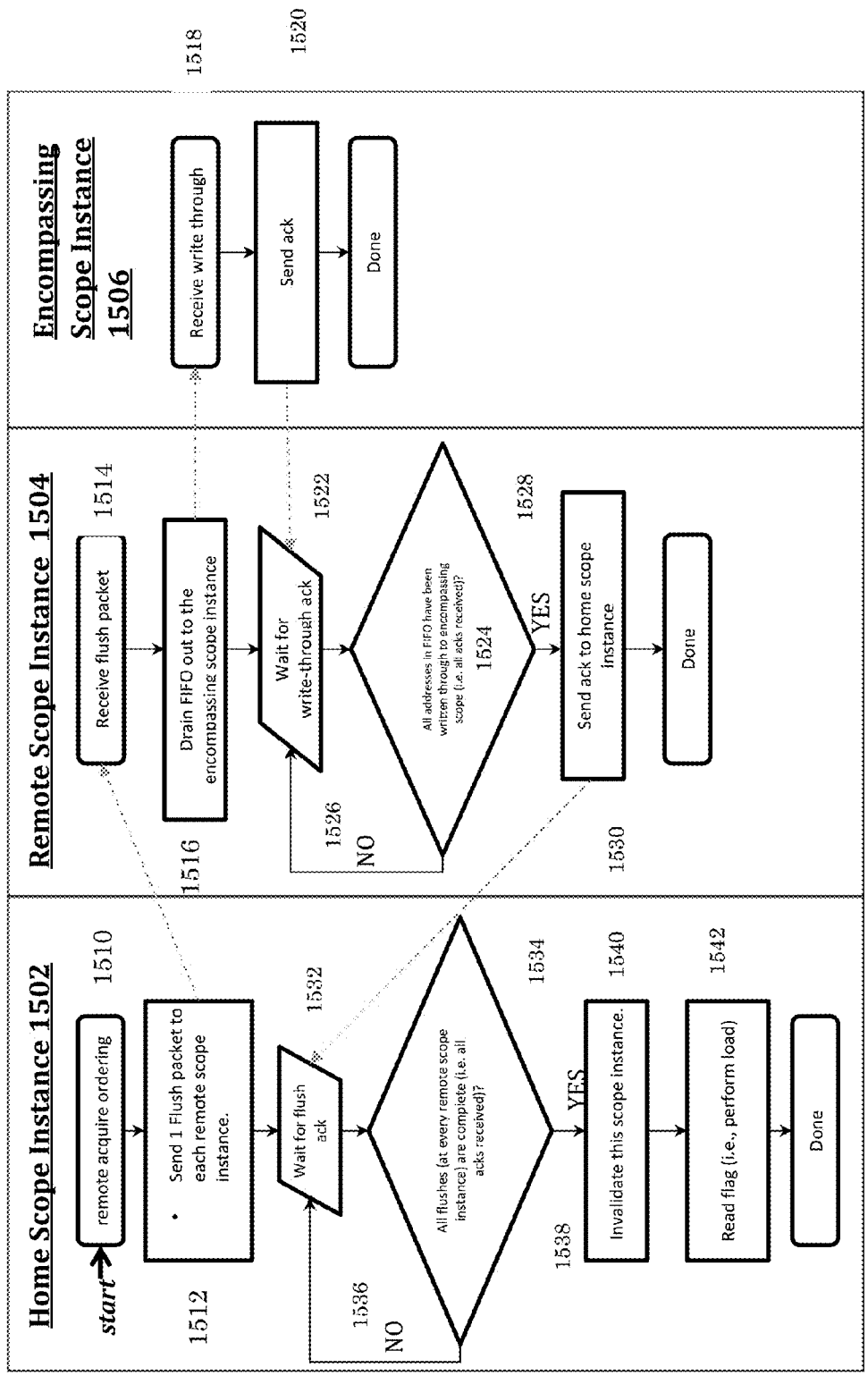
FIG. 15 is an example flowchart for remote acquire in accordance with some embodiments.

FIG. 15 shows an example flowchart of remote acquire as between a home scope instance 1502, a remote scope instance 1504 and encompassing scope instance 1506. A remote acquire order is initiated (1510) by sending a flush packet (1512) to each remote scope instance 1504 (1514). Each remote scope instance 1504 that receives the flush packet flushes its data to the encompassing scope instance 1506 (1516). The encompassing scope instance 1506 writes the data (1518) and sends an acknowledgement (ACK) (1520) to the remote scope instance 1504, which is waiting for the ACK from the encompassing scope instance 1506 (1522). The remote scope instance 1504 determines if all the data has been written to the encompassing scope instance 1506 (1524). If all data has not been written (1526), the remote scope instance 1504 cycles through until all the data has been written by the encompassing scope instance 1506. If all the data has been written (1528), then an ACK is sent to the home scope instance 1502 (1530), which is waiting for ACKS from all the remote scope instances 1504 (1532). The home scope instance 1502 determines if ACKS have been received from all remote scope instances 1504 (1534). If all remote scope instances 1504 have not sent ACKS (1536), the home scope instance cycles through until all of the ACKS have been received. If all ACKS have been received (1538), then the home scope instance performs an invalidate operation (1540) to the specified scope. Finally, the instruction completes by performing the actual memory operation, such as a load (1542).

Remote release ordering ensures writes performed by the requestor are guaranteed to be seen by the remote scope instances. The memory order begins with the requestor performing a flush operation (i.e., push) to the specified scope. Then the actual operation associated with the memory instruction, such as a store, proceeds once the flush completes. Finally, once the memory operation completes, such as the store becomes visible to the specified scope, all remote scope instances that are inclusive with the specified scope are invalidated. For example, if the scope is cmp, the wg scope instances inclusive with respect to the requestor's cmp scope instance would be invalidated.

Figure 16:
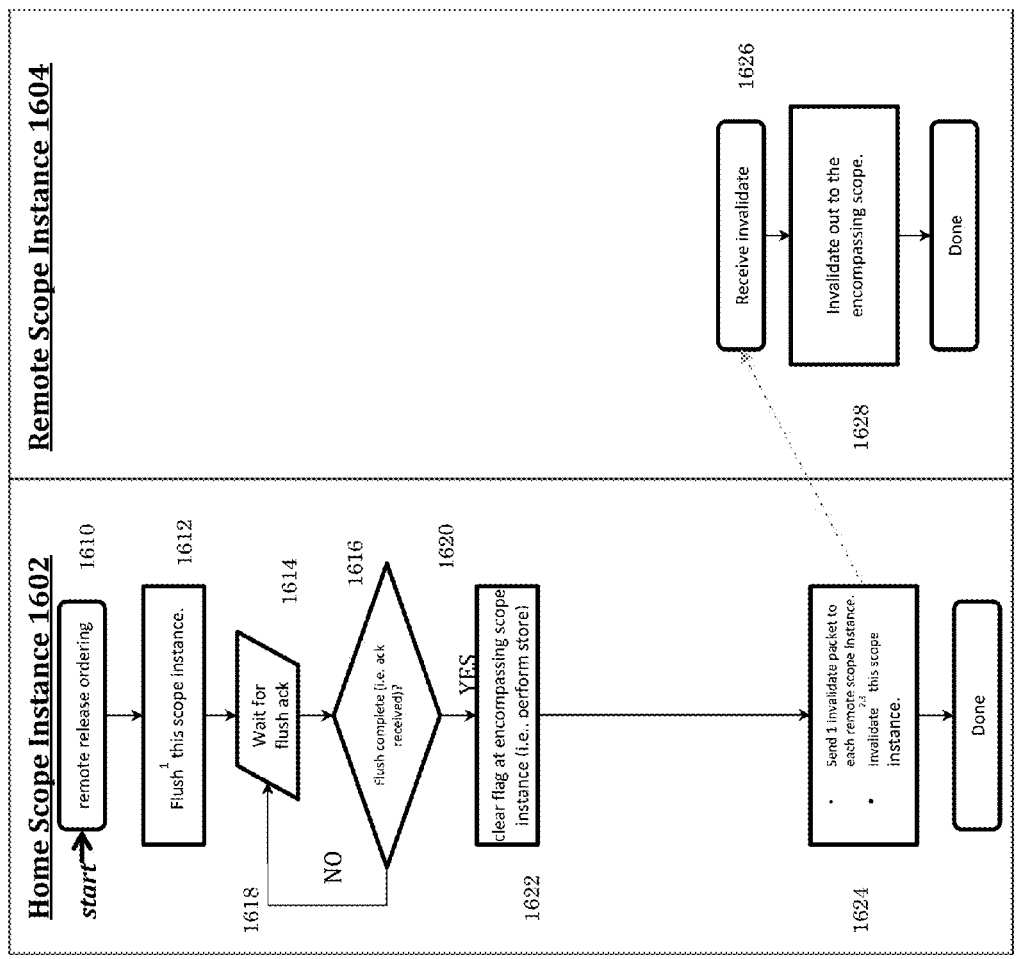
FIG. 16 is an example flowchart for remote release in accordance with some embodiments.

FIG. 16 shows an example flowchart of remote release as between a home scope instance 1602, and a remote scope instance 1604. A remote release order is initiated (1610) by flushing the home scope instance (1612). The home scope instance 1602 waits for the flush ACK (1614) and determines if the flush is complete (1616). If the ACK is not received (1618), the home scope instance cycles until the ACK is received. If the ACK is received (1620), then a memory instruction is performed (1622). Once the memory operation is complete, all remote scope instances 1604 that are inclusive with the specified scope are invalidated by sending an invalidate packet (1624). The remote scope instance 1604 receives the invalidate packet (1626), and performs an invalidate to the encompassing scope (not shown) (1628). The home scope instance 1602 is also invalidated (1624).

Remote acquire+release ordering essentially combines the sequencing of the other two remote orderings to ensure remote read-modify-write operations synchronize correctly. Logically, this operation pulls the remote data, reads/writes it, and then pushes its update back to the remote scope. Similar to the remote acquire memory order, this order begins by performing a flush operation across all remote scope instances that are inclusive with the specified scope. Once complete, the requestor both invalidates and flushes to the specified scope. Next, the actual read-modify-write is performed and made visible to the specified scope. Finally the instruction completes similar to instructions labeled with the remote release order, that is, all remote scope instances that are inclusive with the specified scope are invalidated.

Figure 17:
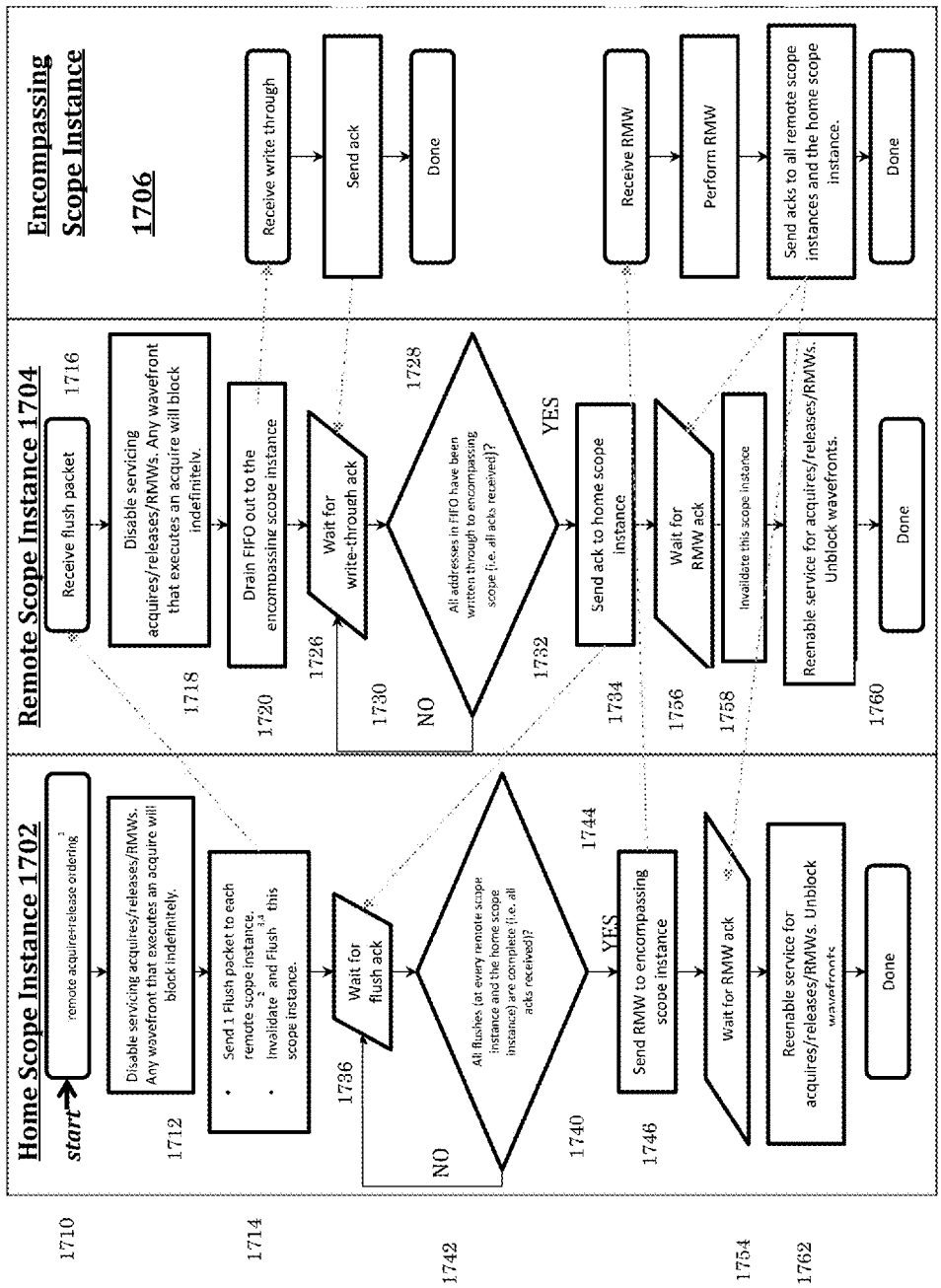
FIG. 17 is an example flowchart for remote acquire-release in accordance with some embodiments.

FIG. 17 shows an example flowchart of remote acquire-release as between a home scope instance 1702, a remote scope instance 1704 and encompassing scope instance 1706. A remote acquire-release order is initiated (1710). The execution or servicing of acquires and/or releases is disabled (1712). A flush packet is sent to each remote scope instance 1704 and the home scope instance 1702 is invalidated and flushed (1714). The remote scope instance(s) 1704 receives the flush packet (1716), disables the execution or servicing of acquires and/or releases (1718), and flushes its data to the encompassing scope instance 1706 (1720). The encompassing scope instance 1706 writes the data (1722) and sends an acknowledgement (ACK) (1724) to the remote scope instance 1704, which is waiting for the ACK from the encompassing scope instance 1706 (1726). The remote scope instance 1704 determines if all the data has been written to the encompassing scope instance 1706 (1728). If all data has not been written (1730), the remote scope instance 1704 cycles through until all the data has been written by the encompassing scope instance 1706. If all the data has been written (1732), then an ACK is sent to the home scope instance 1702 (1734), which is waiting for ACKS from all the remote scope instances 1704 (1736).

The home scope instance 1702 determines if ACKS have been received from all remote scope instances 1704 (1740). If all remote scope instances 1704 have not sent ACKS (1742), the home scope instance 1702 cycles through until all of the ACKS have been received. If all ACKS have been received (1744), then the home scope instance 1702 sends a read-modify-write (RMW) instruction to the encompassing scope instance 1706 (1746). The encompassing scope instance 1706 receives the RMW (1748), performs the RMW instruction (1750), and sends an ACK to all remote scope instances 1704 and the home scope instance 1702 (1752), which are waiting for the ACK (1754 and 1756), respectively. The remote scope instance 1704 performs an invalidation of the instant scope instance (1758) and re-enables the acquire and/or release servicing (1760). The home scope instance 1702 re-enables the acquire and/or release servicing (1762).

Figure 18:
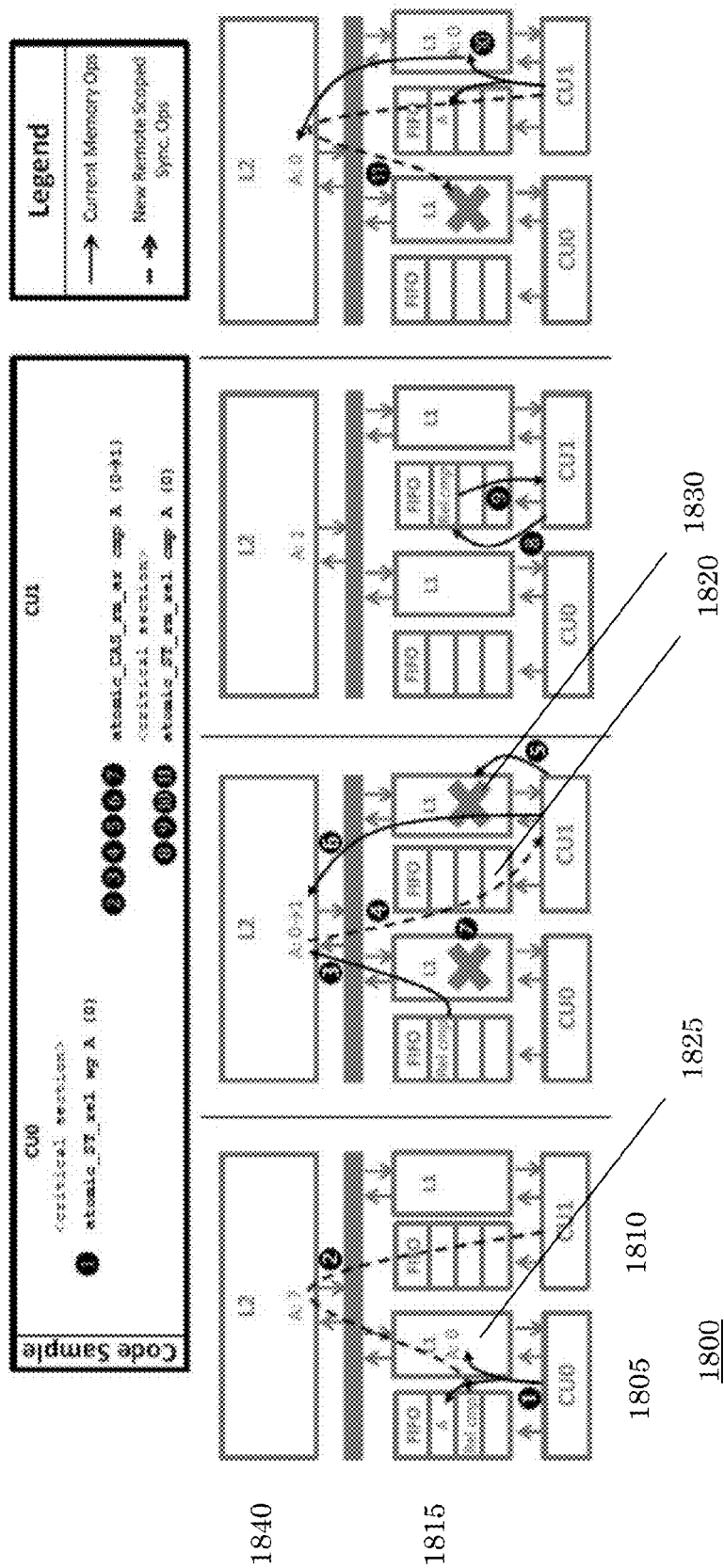
FIG. 18 is a detailed example of imprecise naming/computation move for use in remote scoped synchronization in accordance with some embodiments.

FIG. 18 illustrates an example of remote scoped synchronization in a GPU 1800 composed of two compute units, CU0 1805 and CU1 1810 and assumes the GPU memory system presented herein above, which includes FIFOs at each level of the cache hierarchy to track dirty addresses. In particular, CU0 1805 has a FIFO 1815 and L1 1825 and CU1 1810 has a FIFO 1820 and L1 1830. The L1s 1825 and 1830 are coupled to a L2 1840.

The example illustrates how a critical section protected by a lock, which is frequently accessed by a single work-group, can be occasionally accessed by work-items outside of that work-group. The example assumes the single work-group frequently accessing the critical section is executing on CU0 1805 and the programmer has specified work-group scope for those instructions. The work-items outside of that work-group execute on CU1 1810 and use remote scoped operations to properly synchronize with the work-group accesses. The example highlights that the work-items performing the remote operations encounter the primary performance overhead. Meanwhile, the work-group executing on CU0 1805 encounters minimal overhead using work-group scoped instructions in the common case.

The example begins with a work-item executing on CU0 1805 reaching the end of a critical section. The work-item issues a work-group scoped store release to notify other work-items that the critical section is open. Since the store release is at the work-group scope, no write marker is inserted into the local FIFO 1815. Instead, the store operation is immediately performed at the local L1 cache 1825 and the write address A is inserted into the local FIFO 1815 (time 1).

Next the work-group on CU1 1510 wants to enter the critical section. It attempts to do so by using remote synchronization to pull valid data from the work-group executing on CU0 1805. Specifically, at time 2, a work-item on CU1 1810 executes a compare and swap (CAS) instruction with remote acquire+release memory order semantics using the component scope. The CAS instruction begins with the requestor (CU1 1810) sending a command across the on-chip network that inserts a component scope write marker into all remote FIFOs (in this example there is only one remote FIFO, i.e., FIFO 1815). At time 3, the write marker reaches the head of the remote FIFO, (i.e., FIFO 1815), indicating that all prior writes by CU0 1805 are now completed to the component scope, (i.e., GPU 1800).

Subsequently at time 4, CU1 1810 is notified that all remote write markers it inserted at time 2 have reached the head of their respective remote FIFOs (note: these remote write markers have not stalled work-items executing on the CUs associated with these remote FIFOs). In order to see the latest writes by the remote scope instances, CU1 1810 invalidates its L1 cache 1830 at time 5. In another embodiment, (i.e., as shown in FIG. 17), this invalidation could have been performed in parallel to the operations occurring at times 2, 3 and 4. Then at time 6, CU1 1810 successfully performs the CAS (reads 0→writes 1) at the L2 cache 1840 and the remote work-item gains access to the remote critical section. Finally, the CAS instruction completes at time 7 by invalidating all remote L1 caches. It is important to note that this final remote invalidation does not stall the remote acquire+release instruction. Rather it just needs to be performed before the next acquire operation executed by each remote CU. Furthermore, the invalidation is communicated to the remote CUs using the same request message that inserted the remote write markers at time 2.

After the critical section is complete, CU1 1810 again uses remote release semantics to release the lock. Specifically, CU1 1810 issues a remote store release that begins at time 8 by inserting a component scoped write marker into CU1's FIFO 1820. Then at time 9 the write marker reaches the head of the queue, indicating that all prior writes by CU1 1810 have been completed to the component scope. Now assured that all prior writes are visible, at time 10, CU1 1810 performs the actual store operation writing value '0' to address 'A' and pushes the write to the L2 cache 1840. Finally at time 11, CU1 1810 completes the remote release operation by invalidating all remote L1 caches within its component scope. These invalidations ensure that subsequent reads to address 'A' by any work-item within CU1's 1810 component scope instance will see its latest update, regardless of what scope the reads use.

This example illustrates that remote scoped synchronization put the programming and latency burden on the infrequent remote stealer (e.g. CU1 1810) rather than the frequent local user (e.g. CU0 1805). In addition, the example highlights that remote scoped synchronization seamlessly builds on top of the current state-of-the-art for GPU memory systems Assuming that GPUs already use per-CU FIFOs to track the partial order of writes and release operations, the remote synchronization approach requires two additional mechanisms.

The first mechanism allows work-items to communicate write markers, invalidations, and acknowledgements to other (non-local) CUs. These new communication messages are highlighted in FIG. 18 as dashed lines. Specifically, at time 2, CU1 1810 inserts a write marker into CU0's FIFO 1815, and at time 4, CU1 1810 is acknowledged that its write marker reached the head of CU0's FIFO 1815. Similarly at time 11, CU1 1810 invalidates CU0's L1 cache 1830. Note that CU1 1810 also invalidates CU0's L1 cache 1830 at time 7, but this request is piggybacked with the prior write marker request communicated at time 2.

The second mechanism locks a remote request's cache block at the target scope (e.g., at the GPU L2 cache or memory controller) during the entire sequence of operations. This locking mechanism ensures that the multi-step remote synchronization instructions make forward progress. For example, by locking the addresses at the common scope, the multiple steps of the remote acquire and remote acquire+ release requests are properly handled. In the flow charts, locking occurs by disabling the service of acquires and/or releases and/or RMWs at the remote scope instances.

The introduced remote acquire+release memory ordering allows work-items to order read-modify-write (RMW) instructions within remote scope instances. However, race-free code using scoped synchronization must observe a total order of RMW operations. In this embodiment, a mechanism is needed to ensure that all race-free read-modify-write operations are totally ordered. It is noted that the remote scoped synchronization is believed to adhere to the principles of the HRF memory models, including the total order of RMWs. In essence, the challenge regarding ordering RMWs is that read-modify-writes using wavefront or work-group scope can operate in the L1 cache without obtaining exclusive global permissions. Therefore, read-modify-writes using remote acquire+release ordering must force all scoped operations to read and write to the common scope. Pushing the writes to the common scope is achieved using the remote write markers. However, the acknowledgement identifying the writes completed cannot be sent until the CU ensures the next acquire operation it executes, regardless of the scope specified in the instruction, is promoted to at least the common scope. Promoting the next acquire operation ensures that the next read-modify-write request will either encounter the address locked at the common scope or the new value produced by the remote read-modify-write instruction.

In general, a processing system includes a first scope having a first scope instance and a second scope having a second scope instance, where the first scope instance and the second scope instance are hierarchically unconnected at a respective scope level and where a work-item in one of the first scope and the second scope is configured to remotely access and synchronize one of the second scope instance and the first scope instance associated with a remaining one of the first scope and the second scope. In an embodiment, the work-item is configured to precisely name the other of the second scope instance and the first scope instance. In an embodiment, the work-item is configured to imprecisely name the other of the second scope instance and the first scope instance. In an embodiment, the work-item is configured to use context and scope level to name the other of the second scope instance and the first scope instance. In an embodiment, the work-item is configured to use scope identification to name the other of the second scope instance and the first scope instance. In an embodiment, a translation module is configured to map the second scope instance and the first scope instance to a respective hardware unit. In an embodiment, the first scope and the second scope is at least a work-item, wavefront, work-group, component, or system.

In general, a method for remote scoped synchronization includes instantiating a first scope instance for a first scope, instantiating a second scope instance for a second scope, where the first scope instance and the second scope instance are hierarchically unconnected at a respective scope level, and remotely accessing and synchronizing one of the first scope instance and the second scope instance by a work-item in one of the second scope and the first scope. In an embodiment, the work-item is configured to precisely name the other of the second scope instance and the first scope instance. In an embodiment, the work-item is configured to imprecisely name the other of the second scope instance and the first scope instance. In an embodiment, the work-item is configured to use context and scope level to name the other of the second scope instance and the first scope instance. In an embodiment, the work-item is configured to use scope identification to name the other of the second scope instance and the first scope instance. In an embodiment, the method translates the second scope instance and the first scope instance to a respective hardware unit. In an embodiment, the first scope and the second scope is at least a work-item, wavefront, work-group, component, or system. In an embodiment, the remotely accessing and synchronizing pushes data to a third scope instance that encompasses both the second scope instance and the first scope instance by flushing the one of the second scope instance and the first scope instance to the third scope instance. In an embodiment, the remotely accessing and synchronizing pulls data from a third scope instance that encompasses both the second scope instance and the first scope instance by invalidating the one of the second scope instance and the first scope instance to the third scope instance.

In general, a processing system includes a plurality of scopes, each scope having a scope instance, where each of the scope instances are hierarchically out-of-scope with respect to each of the other scope instances and a work-item from one of the plurality of scopes configured to remotely access and synchronize at least one target scope instance from a remaining ones of the plurality of scopes. In an embodiment, the work-item is configured to precisely name the other of the second scope instance and the first scope instance. In an embodiment, the work-item is configured to imprecisely name the other of the second scope instance and the first scope instance. In an embodiment, the work-item is configured to use context and scope level to name the other of the second scope instance and the first scope instance. In an embodiment, the work-item is configured to use scope identification to name the other of the second scope instance and the first scope instance. In an embodiment, a translation module is configured to map each of the scope instances to a respective hardware unit. In an embodiment, the first scope and the second scope is at least a work-item, wavefront, work-group, component, or system.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing system, comprising:
a processor;
a memory communicatively coupled to the processor, wherein the processor executes a work-item;
a first scope having a first scope instance; and
a second scope having a second scope instance, wherein the first scope instance and the second scope instance are hierarchically unconnected at a respective scope level,
wherein the work-item is executing in the first scope and is configured to remotely access and synchronize the second scope instance with the first scope instance, and
wherein the work-item is further configured to precisely name the second scope instance.

2. The processing system of claim 1, wherein the work-item is further configured to imprecisely name the second scope instance.

3. The processing system of claim 1, wherein the work-item is further configured to use context and scope level to name the second scope instance.

4. The processing system of claim 1, wherein the work-item is further configured to use scope identification to name the second scope instance.

5. The processing system of claim 1, further comprising:
a translation module configured to map the second scope instance and the first scope instance to a respective hardware unit.

6. The processing system of claim 1, wherein the first scope and the second scope is at least a work-item, wavefront, work-group, component, or system.

7. A method for remote scoped synchronization, the method comprising:
instantiating a first scope instance for a first scope;
instantiating a second scope instance for a second scope, wherein the first scope instance and the second scope instance are hierarchically unconnected at a respective scope level, and
remotely accessing and synchronizing the first scope instance with the second scope instance by a work-item executing in the first scope,
wherein the work-item is configured to precisely name the second scope instance.

8. The method of claim 7, wherein the work-item is further configured to imprecisely name the second scope instance.

9. The method of claim 7, wherein the work-item is further configured to use context and scope level to name the second scope instance.

10. The method of claim 7, wherein the work-item is further configured to use scope identification to name the second scope instance.

11. The method of claim 7, further comprising:
translating the second scope instance and the first scope instance to a respective hardware unit.

12. The method of claim 7, wherein the first scope and the second scope is at least a work-item, wavefront, work-group, component, or system.

13. The method of claim 7, wherein the remotely accessing and synchronizing pushes data to a third scope instance that encompasses both the second scope instance and the first scope instance by flushing one of the second scope instance and the first scope instance to the third scope instance.

14. The method of claim 7, wherein the remotely accessing and synchronizing pulls data from a third scope instance that encompasses both the second scope instance and the first scope instance by invalidating one of the second scope instance and the first scope instance to the third scope instance.

15. A processing system, comprising:
a plurality of scopes, each scope having a scope instance, wherein each of the scope instances are hierarchically out-of-scope with respect to each of the other scope instances;
a processor; and
a memory communicatively coupled to the processor, wherein the processor executes a work-item in one of the plurality of scopes, wherein the work-item is configured to remotely access at least one target scope instance from a remaining ones of the plurality of scopes, and
wherein the work-item is configured to perform one of: precisely name the at least one target scope instance, imprecisely name the at least one target scope instance, use context and scope level to name the at least one target scope instance, and use scope identification to name the at least one target scope instance.

16. The processing system of claim 15, further comprising:
a translation module configured to map each of the scope instances to a respective hardware unit.

17. The processing system of claim 15, wherein each of the plurality of scopes is at least a work-item, wavefront, work-group, component, or system.

18. A non-transitory computer-readable storage medium storing a set of instructions for execution by a general purpose computer to perform remote scope synchronization in a processor, comprising:
an instantiating code segment for instantiating a first scope instance for a first scope; and
an instantiating code segment for instantiating a second scope instance for a second scope, wherein the first scope instance and the second scope instance are hierarchically unconnected at a respective scope level, and
a remote accessing and synchronizing code segment for remotely accessing and synchronizing the first scope instance with the second scope instance by a work-item executing in the first scope,
wherein the work-item is configured to perform one of: precisely name the second scope instance, imprecisely name the second scope instance, use context and scope level to name the second scope instance, or use scope identification to name the second scope instance.

19. The non-transitory computer-readable storage medium according to claim 18, wherein the instructions are hardware description language (HDL) instructions used for the manufacture of a device.

* * * * *